Patented Mar. 31, 1953

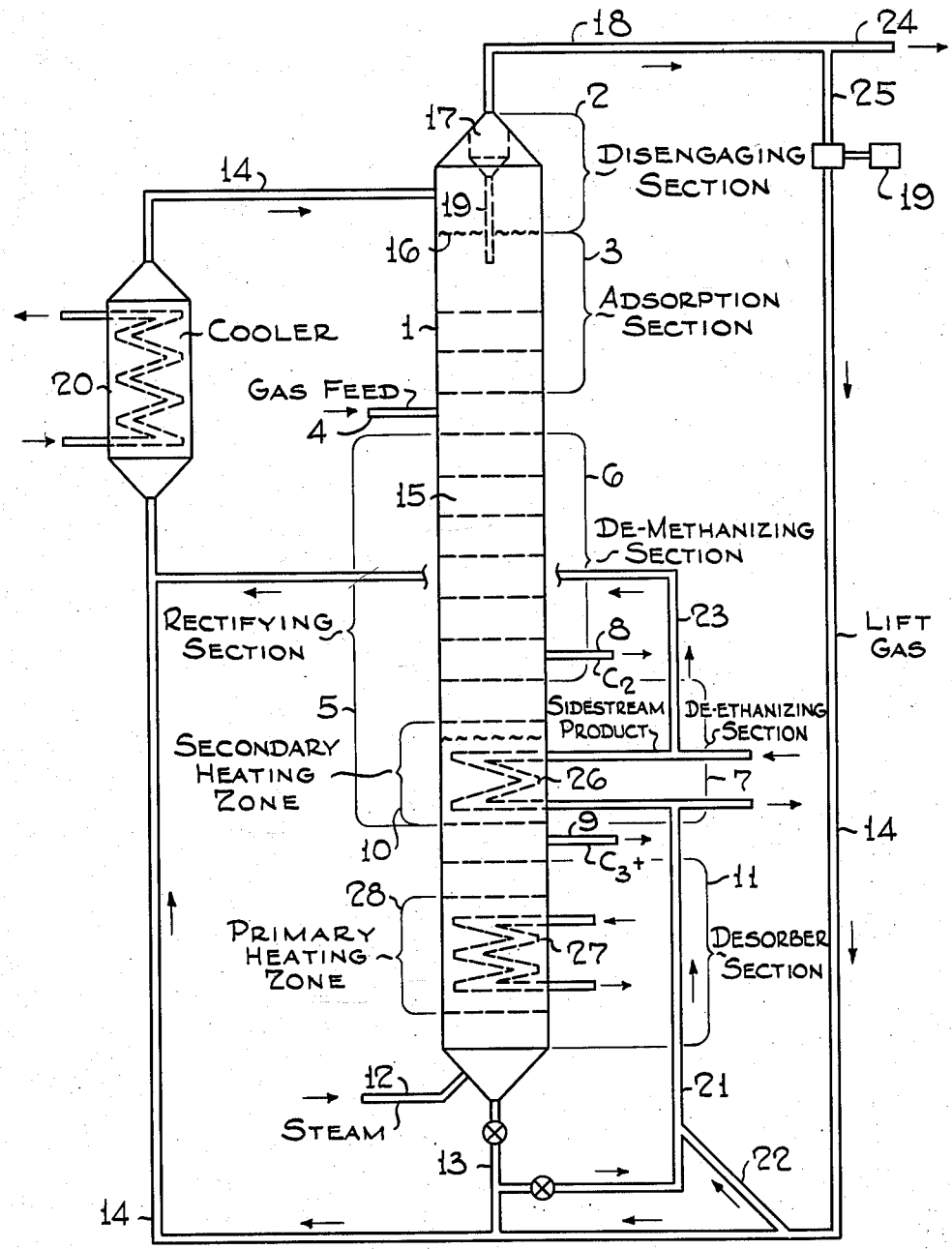

2,633,207

UNITED STATES PATENT OFFICE 2,633,207

ADSORPTION-FRACTIONATION PROCESS

Lewis D. Etherington, Bayonne, N. J., assignor to Standard Oil Development Company, a corporation of Delaware Application April 13, 1949, Serial No. 87,260

12 Claims. (Cl. 183—114.2)

This invention relates to an improved continuous adsorption process employing solid adsorbents for the fractionation of components of a gaseous mixture in an adsorption tower by countercurrent contact with the gaseous mixture and the solid adsorbent. Specifically, the invention is concerned with the stagewise addition of heat in the adsorption-desorption process, and particularly with the addition of heat to the rectifying section of the adsorption tower.

The fractionation of a gaseous mixture by causing it to flow upwardly through an adsorption zone where it contacts an adsorbent material such as charcoal, silica gel, etc., in small particle or powdered form which is passed downwardly through this zone and through a rectifying zone below the point of feed gas entry has already been described. The adsorbent leaving the bottom of the rectifying zone is heated, with or without contact with a stripping gas such as steam, to desorb the adsorbed component of the gas which is separately recovered. The hot stripped adsorbent is then dehydrated, if desired or necessary, cooled, and returned to the top of the adsorption zone for re-use.

In previously described continuous processes for the adsorptive separation of gases, feed gas constituents are adsorbed and rectified into various fractions in a countercurrent tower operation. The "reflux" vapor, which is returned to the bottom of the lower rectification zone, plus the bottoms product are desorbed by heating the adsorbent during countercurrent contact with stripping steam and the hot stripped solid is carried by recycled tower overhead (lift) gas to a suitable cooling unit before entering the top of the adsorption section of the column to repeat the cycle. The adsorption and rectifying tower sections operate adiabatically except for a small heat loss to the surroundings.

It is an object of this invention to provide a continuous countercurrent adsorption-desorption process featuring reduced heat transfer surface requirements in the desorption phase of the process.

It is also an object of this invention to provide a continuous countercurrent adsorption-desorption process which permits the use of heating media of reduced average temperature.

It is an object of the present invention to employ desorbed hot adsorbent for heating the adsorbent in the rectification section of the adsorption zone.

It is a further object of this invention to reduce the excessive adsorber vapor volumes between the desorber heating section and the bottoms product drawoff point as encountered in previously described continuous adsorption processes.

These and other objects of this invention are accomplished by effecting the desorption in two or more heating zones instead of the single primary heating zone employed in the customary desorption operation. It is a feature of this invention to add heat to the adsorption zone particularly in the rectifying section, and more particularly in the lower area of the rectifying section.

Data obtained on charcoal circulation and tower stage requirements for the adsorptive separation of $C_2$ and $C_3$ hydrocarbon fractions from methane and less readily adsorbed gases contained in petroleum refinery gas indicate that the de-ethanizer rectifying section of the adsorption zone may be operated at a higher temperature level without additional required charcoal circulation provided a few additional rectifying stages are used.

In one phase of the present invention it is proposed to heat the adsorbent in at least two zones instead of one in order to realize a decrease in heating surface requirements, to effect more complete heat exchange between hot and cold adsorbent streams which results in reduced extraneous heating and cooling requirements and cooling surface, to permit the use of a lower average temperature heating medium in the desorber, and to reduce excessive vapor volumes in the desorber.

Suitable apparatus for use in the process of this invention is shown diagrammatically in the attached drawing. The figure represents a section elevational view of one type of apparatus adapted to carrying out the process of the invention.

Referring to the drawing the invention will be described for purposes of example only by the separation of $C_2$ and $C_3$ hydrocarbons from a fraction containing a mixture of $C_1$ to $C_3+$ hydrocarbons and less adsorbable gaseous components such as hydrogen and nitrogen by means of charcoal adsorption. The numeral 1 represents an adsorption tower containing in descending order a tail gas removal line 18, an uppermost disengaging section 2, an adsorption section 3, a gas feed line 4, a rectification section 5 comprising a de-methanizing section 6 and a de-ethanizing section 7, a $C_2$ vapor removal line 8, a $C_3+$ vapor removal line 9, a secondary heating zone 10 containing heating unit 26 located in the de-ethanizing section, a desorber section 11, a steam entry line 12 and a solids withdrawal line 13. The desorber section 11 contains the primary heating zone 28 equipped with one or more heating coils 27.

The feed gas comprising a mixture of methane, $C_2$ hydrocarbons, $C_3$ hydrocarbons and less readily adsorbed components such as nitrogen and hydrogen is introduced, usually under pressure, into the adsorption tower via line 4 at a point between the adsorption section and the rectification section. A mass of charcoal adsorbent cooled to approximately 120° F.–200° F. is introduced into the top of the adsorption section of the tower at the disengaging section via line 14. The adsorption tower may be operated as a soaker type reactor in which the tower is packed with solid adsorbent which gravitates slowly from the top to the bottom of the tower, or the tower may be operated with fluidized charcoal in which event the tower will contain trays 15 spaced at regular intervals and upon which the charcoal will build up and reach a level indicated by the numeral 16. The adsorbent passes down the tower at such a rate that substantially all the $C_2$ and heavier hydrocarbons are selectively adsorbed on the adsorbent within the adsorption section while the methane and lighter components, e. g., nitrogen and hydrogen, pass overhead via cyclone 17 and leave the tower via line 18. Entrained charcoal separated from this gas in cyclone 17 is returned to the tower via dipleg 19. The charcoal passes down the tower into the rectification section 5 below the feed point. In the upper part of the rectification section, i. e., in the de-methanizing section 6, any amounts of methane, nitrogen, hydrogen, etc. which may have remained on the adsorbent as it passes down through the tower are desorbed by the reflux action of the more adsorbable upwardly rising $C_2+$ hydrocarbon vapors which have been desorbed from the adsorbent at lower points within the de-ethanizing section 7 and the desorber 11. The displaced less readily adsorbed materials flow upwardly past the gas feed line 4 into the adsorber section and are eventually withdrawn from the system via line 18.

In the lower area of the rectification section, i. e., in the de-ethanizing section 7, the adsorbent is refluxed with the heavier components of the hydrocarbon feed, for example, the $C_3+$ hydrocarbons similarly released in the lower section of the tower by the action of the desorber 11 and the secondary heating zone 10, whereby the desorption of the $C_2$ hydrocarbons is brought about. The $C_2$ hydrocarbons containing controlled amounts of methane and unavoidable small equilibrium quantities of $C_3+$ hydrocarbons are removed in controlled amounts as a vapor stream from a point near the center of the rectification section via line 8 at a temperature of about 200°–240° F.

The charcoal substantially free of $C_2$ and lighter components passes from the lowermost area of the rectification section 5 into the desorber 11 containing the primary heating zone 28. In the desorber the desorption of the $C_3+$ hydrocarbons is accomplished by means of stripping vapor such as steam and by heat supplied indirectly to the enriched charcoal by suitable heating means such as by condensation of high boiling liquid such as diphenyl or a mixture of diphenyl and diphenyl oxide, by hot flue gas, etc. The action of the heat together with the countercurrent stripping action of steam introduced via line 12 disengages the $C_3+$ hydrocarbons from the adsorbent. These hydrocarbons pass upwardly through the desorber section. The product portion is withdrawn through line 9 at a temperature of about 350° F. and the remaining portion is returned as reflux vapor to the bottom of the rectification section 5. The $C_3+$ stream contains appreciable amounts of water vapor which may be removed therefrom by appropriate cooling or quenching operation.

The $C_3+$ reflux vapor from the desorber also contains an appreciable quantity of steam. This reflux may also be quenched or cooled for steam removal before passing to the rectification section, or may be passed to this section as wet gas. In the latter case, the major portion of the refluxed steam is adsorbed in the rectification section and returns to the desorber, i. e., there is an internal recycle of steam between the two tower sections. When the reflux vapor is dried before introduction into the rectification section as described, the addition of heat to the rectification section reduces the excessive amount of reflux $C_3+$ vapor to be quenched or cooled and there is an attendant reduction in required cooling, heating and heat exchange surface for the overall adsorption process.

Additional sidestreams representing one or more intermediate cuts may be obtained by expanding the rectifier section and removing, in addition to a more concentrated $C_3$ product, heavier hydrocarbons such as $C_4$ and $C_5$ streams at lower points in the rectifier section. The major component of each additional sidestream would be contaminated chiefly with small equilibrium quantities of heavier material.

The hot stripped charcoal from the desorber section 11 at a temperature of about 500° F. is removed via line 13 and circulated via gas lift line 14 with the assistance of tail gas to a cooling zone 29 in which the charcoal is cooled to a temperature in the range of 120° F. to 200° F. The cooled charcoal enters the top of the disengaging section 2 via line 14. In the disengaging section the recycled tail gas employed as lift gas plus the net tail gas overhead from the adsorption zone are removed via line 18 while the charcoal descends into the tower to repeat the cycle.

Although the secondary heating zone 10 has been illustrated by a single heating unit consisting of a single stage, this single unit may comprise two or more adjacent stages; or, two or more units separated by adiabatic portions of the de-ethanizing section 7 may be employed with each unit consisting of one or more adjacent stages. The adsorbent and contacting vapor will be at progressively increasing average temperature levels in the various stages, moving downwardly in the tower, such that the benefits described in the following paragraph will be at a maximum. It is usually preferable to locate the units of the secondary heating zone 10 in the de-ethanizing section below the immediate vicinity of the point of withdrawal of the intermediate $C_2$ product vapor sidestream in order to minimize the unavoidable equilibrium quantities of $C_3+$ hydrocarbons in the $C_2$ product.

Although the primary heating zone 28 contained in the desorber 11 has been illustrated as a single stage, two or more adjacent stages at progressively increasing temperatures (moving downwardly) may be used, resulting in decreased required primary heating surface for a given constant temperature heating media used throughout the primary heating zone. The use of more than one primary heating stage is particularly advantageous when using fluidized adsorbent.

From the above description it will be apparent that a portion of the total heating load required for desorption of the charcoal is added in the secondary heating zone 10 in the de-ethanizing (C₃-enriching) adsorber section above the desorber and the remaining heat is added at the bottom of the tower in the primary heating zone 28 contained in the desorber 11. In supplying a portion of the total heat to the lower portion of the rectifying zone instead of all the heat to the desorber the average temperature level of the charcoal being heated is lowered and the total heat transfer surface requirements are reduced when using heating media at the same high temperature for both heating zones. Alternately, the average temperature level of the heating media for the secondary heating zone 10 may be lowered thereby permitting the use of less expensive extraneous heating media. As a further alternative, the hot stripped charcoal from the bottom of the desorber may be used as the heating medium for heating the rectifying section, i. e., by indirect heat exchange between the hot desorber exit charcoal and the colder charcoal in the adsorber rectifying section. Thus, in effectively utilizing the sensible heat of the hot desorbed charcoal, the amount of required extraneous heat addition is reduced, the amount of required coolant such as cooling water to cool the hot desorbed adsorbent for its re-use in the adsorption section is reduced, and the required cooling surface is reduced.

When using more than one stage in the primary heating zone contained in the desorber as previously described such that the upper stages of this zone are operated colder than the lower stages of the said heating zone, hot desorbed charcoal from the bottom of the desorber may also be heat exchanged against the colder charcoal in the upper heating stages of the desorber to obtain recovery of sensible heat from the hot desorbed charcoal. However, heat exchange of the hot desorbed charcoal with charcoal in the rectification section provides for more complete recovery of hot charcoal sensible heat and with less required heat exchange surface due to the lower temperature of the charcoal in the rectifying section as compared to temperatures of charcoal in the top desorber heating stages.

Usually, no more than three primary heating zone stages, operating simultaneously as stripping stages in the desorber 11, are justified when using a fluidized adsorbent. However, additional adiabatic or non-heated stripping stages are usually desired for the desorber in order to minimize the required stripping steam. When using more than one primary heating zone stage, it is usually desirable that these stages be adjacent rather than be separated by non-heated desorber stages. The primary heating zone may comprise one or more of the top desorber stages, or the heated desorber stages may be located between non-heated adsorber stages as illustrated. Also, heating by means of the primary heating zone may be effected throughout the desorber section.

In the customary operation the desorber heating medium is maintained at a temperature in the vicinity of 600° F.–700° F. in the heating tubes which requires the use of expensive, high temperature condensation materials as previously mentioned, gas fired heaters, or high pressure steam which is outside the range of that normally available in the refinery. By the use of stage heating as described in this invention it is possible to lower the average temperature of the heating medium in all or part of the heating system.

In the adsorptive separation of C₂ and C₃ hydrocarbons from methane and less readily adsorbed gases such as occur in refinery residue cracking gases, it has been found that the adsorption and rectification of the C₂ fraction requires a greater portion of the total charcoal circulation than the adsorption and rectification of the C₃ fraction. Therefore, when both C₂ and C₃ fractions are being adsorbed and separated simultaneously in a single adsorber, there is considerably more charcoal circulation through the de-ethanizer adsorber section 7 per unit amount of C₃ product than would be practical when adsorbing only C₃ from a feed gas containing C₁ through C₃ hydrocarbons. Thus, for the former separation case, the amounts of adsorbed and vapor reflux phases in the de-ethanizing section are necessarily excessive when no heat is added to this section, and the required number of stages for the de-ethanizing adsorber section is very small. The existence of this condition has been found to tolerate the addition of heat to the de-ethanizing section 7 which reduces the adsorbed and reflux vapor phases in this section without an appreciable increase in the required number of rectifying stages and with no required increase in the charcoal circulation. The addition of heat to the rectifying section takes a considerable heat load off the desorber heating zone so that the advantages previously described may be realized. Also, in reducing the excessive amount of reflux vapor (by the addition of heat to the rectification zone), which, together with the C₃ product and the stripping steam, constitutes the tower vapor load between the top primary heating zone stage and the C₃ product withdrawal line, the diameter of this section of the adsorber, normally excessive, may be reduced appreciably.

These advantages of the present invention may be realized also in the adsorptive separation of a feed gas into only two separate fractions with a single tower but to an indicated lower extent than when separating the feed mixture into three or more fractions in a single tower operation.

Due to the comparatively low temperature of the de-ethanizer section 7, low-temperature heat may be applied to the secondary heating zone 10 by high pressure steam, by low temperature diphenyl or diphenyl-diphenyl oxide mixtures, or by the desorbed hot charcoal circulated from the bottom of the desorber via lines 13 and 21 through the heater 26 in solids-to-solids heat exchange. To accomplish the latter, all or a portion of the hot charcoal is withdrawn from line 13 via line 21, and, with the assistance of lift gas in line 22 withdrawn from line 14, is carried through the coils of heater 26. From the heater 26 the charcoal, which has given up some of its sensible heat, is introduced into cooler 20 via lines 23 and 14 for additional cooling. The hot desorbed charcoal inside the coils of heater 10 may exist as a dense fluidized solid, similar to the colder solid in the de-ethanizing section, in order to obtain maximum overall heat transfer coefficients when heat exchanging the two solid streams.

Although the addition of heat to the rectifying section has been described by means of an internal coil located within the adsorption tower, the object of the invention can be accomplished by other suitable means. For example, charcoal may be removed from the rectifying section, heated in an external heater and returned to the rectifying section at the desired point. Similarly a vapor stream may be removed from the rectifying section, heated externally and returned to the tower in contact with the charcoal in the rectifying section. However, it is preferable to add heat to the rectifying section by means of heating the adsorbent therein rather than by heating the vapor.

The multi-stage heating described in the adsorption process of this invention is independent of the manner in which the charcoal is cooled. The charcoal may be totally cooled in the one cooling zone located inside of or outside of the adsorption tower, or the cooling may be done stage-wise in two or more cooling zones all located outside the adsorption tower, or some cooling zones may be located outside the adsorption tower while others are located within the adsorption tower. The manner in which the charcoal is cooled is not a subject of this invention.

In the process illustrated in the drawing the tail gas emerges from the adsorption tower via line 18 and is removed in part via line 24 as net product to a tail gas water scrubber or filter (not illustrated) where the remaining entrained charcoal of fine particle size is removed therefrom. A portion of the tail gas is removed via line 25, repressured by blower 19 and recycled as lift gas via line 14 to carry the desorbed hot charcoal through the cooling zone and back into the adsorption tower.

It is understood that during the adsorption-desorption cycle some of the charcoal adsorbent will become deactivated thus requiring regeneration. The regeneration is carried out by conventional means and is not a part of this invention.

It is preferred to remove acidic gases such as carbon dioxide and hydrogen sulfide from the hydrocarbon feed to the charcoal adsorbent fractionation process by suitable pretreatment of the feed before it enters the adsorption zone in order to minimize metal corrosion and contamination of products.

When the system is operated employing a fluidized asorbent in the adsorption tower the adsorbent is handled as a dense fluid bed in which the particles average approximately 50–200 micron particle size. The particles possess considerable motion reative to each other and plates or packing are required in the tower in order to effect sufficient countercurrent contact between the adsorbent and vapor. The tower may be supplied with perforated plates equipped with simple standpipe overflows, the vapor passing upwardly through the plate perforations at a velocity sufficiently high to prevent downward passage of charcoal therethrough and to provide good solids fluidization. Packing or bubble-cap plates can also be employed. Approximately 1 to 3 feet of dense bed and 2 feet of vapor disengaging space per plate are adequate to establish a satisfactory approach to equilibrium between vapor and solid within a single stage when using fluidized adsorbent. In the moving-bed type of operation the feed gas is fed to the tower at a point near the center thereof. The tower is packed with an adsorbent of approximately 10 to 30 mesh in size which in the case of charcoal would amount to a bulk density of about 30 lbs. per cubic ft. The tower is usually operated under approximately the same pressure at which the feed gas is available. The packed adsorbent gravitates at a predetermined rate from the top to the bottom of the tower as previously described.

The charcoal inventory in a tower of a given diameter and height is much smaller when the adsorbent is fluidized than when it is handled as a moving-bed, and fluidized solids permit much higher allowable tower vapor velocities. Also, much higher heat transfer coefficients are obtained with fluidized solids than with close packed solids.

The invention is generally applicable to fractionation processes of the type illustrated above, involving selective adsorption of one or more components from a mixture containing other components which are more or less readily adsorbed. In such operations it may be used to separate hydrocarbon mixtures into fractions of different boiling range or chemical structure by suitable selection of adsorbents and stripping agents in conformity with chromatographic principles. For example, paraffins, naphthenes, olefins, diolefins and aromatics may be obtained as separate fractions from mixtures of two or more of these classes of hydrocarbons with a silica gel adsorbent used in an adsorption process as described above in one or more stages according to the number of fractions to be separated. Similarly, organic vapors of different degrees of polarity may also be separated by selective adsorption on any suitable solid adsorbents.

The process is particularly applicable to the recovery of $C_2$ and $C_3$ hydrocarbons from refinery fuel gas; to the recovery of light ends from low-pressure catalytic cracking gases; to the recovery of hydrocarbons and oxygenated compounds from hydrocarbon synthesis gas produced at low pressures; to the separation of methane from nitrogen; to the recovery of acetylene from the gases of the Wulff process, and to the separation of $C_2$, hydrogen sulfide, and light oil fractions from coke-oven gas.

What is claimed is:

1. A continuous process for the separation of gaseous components of a mixture comprising a less readily adsorbed component A, a more readily adsorbed component C, and an intermediate component B by means of adsorption by a solid absorbent which comprises, passing said adsorbent downwardly through an adsorption zone having an adsorption section above the gaseous mixture feed-point, a middle rectification section and a lower desorption section below the gaseous mixture feed-point, continuously feeding the gaseous mixture to a lower portion of the adsorption section, removing unadsorbed component A from an upper portion of the adsorption zone, passing the adsorbent containing adsorbed thereon components B and C into said rectification section, removing component B from a point near the center of the rectification section, heating the adsorbent in the lower portion of said rectification section to an extent sufficient to cause vaporization of a substantial proportion of component C from the downflowing adsorbent therein, passing the adsorbent containing remaining undesorbed component C adsorbed thereon into the desorption section, and recovering remaining undesorbed component C by heating and stripping the adsorbent in the desorption section.

2. A process according to claim 1 in which steam is added to the desorption zone to assist in the desorption of component C.

3. A process according to claim 1 in which heat is supplied to the lower section of the rectification section by passing therethrough in indirect heat exchange hot solid adsorbent recovered from the desorption section.

4. A continuous process for concentrating a $C_2$ hydrocarbon fraction from a gaseous mixture comprising methane, $C_2$ hydrocarbons and $C_3$ hydrocarbons by means of adsorption by a solid adsorbent which comprises, passing said adsorbent downwardly through an adsorption zone having an adsorption section above the gaseous mixture feed-point, a middle rectification section and a lower desorption section below the gaseous mixture feed-point, continuously feeding the gaseous mixture to a lower portion of the adsorption section, removing unadsorbed methane from the upper portion of the adsorption zone, passing the adsorbent containing adsorbed thereon substantially $C_2$ and $C_3$ hydrocarbons into the rectification section, heating the adsorbent in the lower portion of said rectification section to an extent sufficient to cause vaporization of a substantial portion of $C_3$ hydrocarbons from the downflowing adsorbent, removing $C_2$ hydrocarbons from a point near the center of the rectification section, passing the adsorbent containing remaining undesorbed substantially $C_3$ hydrocarbons adsorbed thereon into the desorption section, and recovering remaining undesorbed $C_3$ hydrocarbons by heating and stripping the adsorbent in the desorption section.

5. A process according to claim 4 in which hot adsorbent is removed from the desorption section and passed through the lower section of the rectification zone in indirect heat exchange.

6. A process according to claim 4 in which the adsorbent is charcoal.

7. A process according to claim 4 in which the gaseous mixture also contains $C_4$ hydrocarbons which are removed from the adsorbent with the $C_3$ hydrocarbons.

8. A process according to claim 4 in which gaseous mixture also contains less readily adsorbable components which pass overhead from the adsorber with the methane.

9. A process according to claim 4 in which the gaseous mixture comprises methane, ethane, ethylene, propane and propylene.

10. A process according to claim 4 in which the solid adsorbent is fluidized carbon.

11. A process according to claim 4 in which the adsorbent is in a fluidized condition throughout the process and in which a portion of $C_3$ hydrocarbons vaporized in the desorption section is removed as net product and the remaining portion is refluxed to a bottoms portion of the rectification section to fluidize the adsorbent therein.

12. A process according to claim 4 in which heat is supplied to the adsorbent in the lower portion of said rectification section by indirect heat exchange.

LEWIS D. ETHERINGTON.

REFERENCES CITED

The following references are of record in the file of this patent:

UNITED STATES PATENTS

| Number | Name | Date |
|---|---|---|
| 1,422,007 | Soddy | July 4, 1922 |
| 2,250,716 | Legatski | July 29, 1941 |
| 2,348,009 | Johnson et al. | May 2, 1944 |
| 2,412,025 | Zimmerman | Dec. 3, 1946 |
| 2,495,842 | Gilliland | Jan. 31, 1950 |
| 2,522,059 | Ray et al. | Sept. 12, 1950 |
| 2,529,289 | Gilliland | Nov. 7, 1950 |

FOREIGN PATENTS

| Number | Country | Date |
|---|---|---|
| 317,629 | Great Britain | Aug. 22, 1929 |

OTHER REFERENCES

"Hypersorption Process for Separation of Light Gases," Clyde Berg, Transactions of A. I. Ch. E., vol. 42, No. 4, 1946, pages 665–680.